United States Patent [19]
Stilwell et al.

[11] Patent Number: 5,235,612
[45] Date of Patent: Aug. 10, 1993

[54] METHOD AND APPARATUS FOR CANCELLING SPREAD-SPECTRUM NOISE

[75] Inventors: James H. Stilwell, Mesa, Ariz.; Reuven Meidan, Ramat Hasharon, Israel; Michael Kotzin, Buffalo Grove, Ill.

[73] Assignee: Motorola, Inc., Schaumburg, Ill.

[21] Appl. No.: 723,106

[22] Filed: Jun. 28, 1991

Related U.S. Application Data

[63] Continuation-in-part of Ser. No. 632,452, Dec. 12, 1990, Pat. No. 5,105,435.

[51] Int. Cl.$^5$ .................................. H04L 27/30
[52] U.S. Cl. .................................. 375/1; 380/34; 370/18; 370/22; 375/99; 375/102; 455/63; 455/296
[58] Field of Search .......... 375/34, 99, 102, 103, 375/1; 380/34; 370/18, 19, 21, 22; 455/278.1, 284, 296, 303, 305, 50.1, 63, 67.3

[56] References Cited

U.S. PATENT DOCUMENTS

| | | | |
|---|---|---|---|
| 3,374,435 | 3/1968 | Engel | 375/102 |
| 3,617,900 | 11/1971 | Fink et al. | 324/82 |
| 3,667,050 | 5/1972 | Gibson | 375/101 |
| 3,699,463 | 10/1972 | Stone | 329/300 |
| 4,327,438 | 4/1982 | Baier et al. | 375/1 |
| 4,472,814 | 9/1984 | Gutleber | 375/34 |
| 4,472,815 | 9/1984 | Gutleber | 375/34 |
| 4,475,214 | 10/1984 | Gutleber | 375/34 |
| 4,475,215 | 10/1984 | Gutleber | 375/34 |
| 4,608,701 | 8/1986 | Burgers et al. | 375/1 |
| 4,914,676 | 4/1990 | Iwamatsu et al. | 375/102 |
| 5,099,493 | 3/1992 | Zeger et al. | 375/1 |
| 5,109,390 | 4/1992 | Gilhousen et al. | 375/1 |
| 5,136,612 | 8/1992 | Bi | 375/1 |

FOREIGN PATENT DOCUMENTS 55-147847  11/1980  Japan ............ 375/102

OTHER PUBLICATIONS

"Spread Spectrum Multiple Access System with Intrasystem Interference Cancellation", Tatsuro Masamura, The Transactions of the Institute of Electronics, Information and Communication Engineers, vol. E71, No. 3 (Mar. 1988), pp. 223-231.

Primary Examiner—Bernarr E. Gregory
Attorney, Agent, or Firm—Shawn B. Dempster

[57] ABSTRACT

A spread-spectrum noise canceller (390) is provided for cancelling user code noise from a spread-spectrum communication channel. The spread-spectrum noise canceller (390) includes a receiver for receiving a spread-spectrum signal (302) including a first and at least a second signal as well as a noise canceller (390) operatively coupled to the receiver for reducing spread-spectrum noise in the first received signal by substantially processing the at least second received signal out of the received spread-spectrum signal (302).

In addition, a method is provided which cancels user code noise from a spread-spectrum communication channel. The method includes receiving a spread-spectrum signal (302) including a first and at least a second signal and subsequently reducing spread-spectrum noise in the first received signal by substantially processing the at least second received signal out of the received spread-spectrum signal (302).

26 Claims, 6 Drawing Sheets

METHOD AND APPARATUS FOR CANCELLING SPREAD-SPECTRUM NOISE

This is a continuation-in-part of application Ser. No. 07/632,452 filed on Dec. 12, 1990, now U.S. Pat. No. 5,105,435.

FIELD OF THE INVENTION

The present invention relates to communication systems which employ spread-spectrum signals and, more particularly, to a method and apparatus for cancelling spread-spectrum noise in a communication channel.

BACKGROUND OF THE INVENTION

In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of channels exist, namely, point-to point channels and broadcast channels. Examples of point-to-point channels include wirelines (e.g., local telephone transmission), microwave links, and optical fibers. In contrast, broadcast channels provide a capability where many receiving stations may be reached simultaneously from a single transmitter (e.g. local television and radio stations).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, and improved security of communication through the use of encryption.

These advantages are attained at the cost of increased transmission (channel) bandwidth and increased system complexity. Through the use of very large-scale integration (VLSI) technology a cost-effective way of building the hardware has been developed.

One digital transmission method that may be used for the transmission of message signals over a communication channel is pulse-code modulation (PCM). In PCM, the message signal is sampled, quantized, and then encoded. The sampling operation permits representation of the message signal by a sequence of samples taken at uniformly spaced instants of time. Quantization trims the amplitude of each sample to the nearest value selected from a finite set of representation levels. The combination of sampling and quantization permits the use of a code (e.g., binary code) for the transmission of a message signal. Other forms of digital transmission use similar methods to transmit message signals over a communication channel.

When message signals are digitally transmitted over a band-limited channel, a form of interference known as intersymbol interference may result. The effect of intersymbol interference, if left uncontrolled, is to severely limit the rate at which digital data may be transmitted without error over the channel. The cure for controlling the effects of intersymbol interference may be controlled by carefully shaping the transmitted pulse representing a binary symbol 1 or 0.

Further, to transmit a message signal (either analog or digital) over a band-pass communication channel, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Correspondingly, the receiver is required to re-create the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

Typically, in propagating through a channel, the transmitted signal is distorted because of nonlinearities and imperfections in the frequency response of the channel. Other sources of degradation are noise and interference picked up by the signal during the course of transmission through the channel. Noise and distortion constitute two basic limitations in the design of communication systems.

There are various sources of noise, internal as well as external to the system. Although noise is random in nature, it may be described in terms of its statistical properties such as the average power or the spectral distribution of the average power.

In any communication system, there are two primary communication resources to be employed, namely, average transmitted power and channel bandwidth. The average transmitted power is the average power of the transmitted signal. The channel bandwidth defines the range of frequencies that the channel can handle for the transmission of signals with satisfactory fidelity. A general system design objective is to use these two resources as efficiently as possible. In most channels, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitted power determines the signal-to-noise ratio at the receiver input. This, subsequently, determines the noise performance of the receiver. Unless performance exceeds a certain design level, the transmission of message signals over the channel is not considered to be satisfactory.

Additionally, channel bandwidth is important because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

For spread spectrum communication systems, these areas of concern have been optimized in one particular manner. In spread spectrum systems, a modulation technique is utilized in which a transmitted signal is spread over a wide frequency band. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. A spread spectrum system, on the other hand, often takes a baseband signal (e.g., a voice channel) with a bandwidth of only a few kilohertz, and distributes it over a band that may be many megahertz wide. This is accomplished by modulating with the information to be sent and with a wideband encoding signal. Through the use of spread spectrum modulation, a message signal may be transmitted in a channel in which the noise power is higher than the signal power. The modulation and demodulation of the message signal provides a signal-to-noise gain which enables the recovery of the message signal from a noisy channel. The greater the signal-to-noise ratio for a given system equates to: (1) the smaller the bandwidth required to transmit a message signal with a low rate of error or (2) the lower the average transmitted power required to transmit a message signal with a low rate of error over a given bandwidth.

Three general types of spread spectrum communication techniques exist, including:

The modulation of a carrier by a digital code sequence whose bit rate is much higher than the information signal bandwidth. Such systems are referred to as "direct sequence" modulate systems.

Carrier frequency shifting in discrete increments in a pattern dictated by a code sequence. These systems are called "frequency hoppers". The transmitter jumps from frequency to frequency within some predetermined set; the order of frequency usage is determined by a code sequence. Similarly "time hopping" and "time-frequency hopping" have times of transmission which are regulated by a code sequence.

Pulse-FM or "chirp" modulation in which a carrier is swept over a wide band during a given pulse interval.

Information (i.e. the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent, and (2) some function other than the information being sent is employed to determine the resulting modulated channel bandwidth.

The essence of the spread spectrum communication involves the art of expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

The present invention enhances the ability of spread-spectrum systems and, in particular, code division multiple access (CDMA) cellular radio-telephone systems to recover spread spectrum signals from a noisy radio communication channel. In CDMA cellular radio-telephone systems, the "users" are on the same frequency and separated only by unique user codes. The noise interference level in the communication channel is directly related to the interference level created by the users and not by additive Gaussian noise like in other communication systems. Thus, the number of users that can simultaneously use the same frequency band in a given cellular region is limited by the code noise of all active "users". The present invention reduces the effects of undesired user code noise and thus significantly increases the number of users which can simultaneously be serviced by a given cellular region.

SUMMARY OF THE INVENTION

A spread-spectrum noise canceller is provided for cancelling user code noise from a spread-spectrum communication channel. The spread-spectrum noise canceller includes a receiver for receiving a spread-spectrum signal including a first and at least a second signal as well as a noise canceller operatively coupled to the receiver for reducing spread-spectrum noise in the first received signal by substantially processing the at least second received signal out of the received spread-spectrum signal.

In addition, a method is provided which cancels user code noise from a spread-spectrum communication channel. The method includes receiving a spread-spectrum signal including a first and at least a second signal and subsequently reducing spread-spectrum noise in the first received signal by substantially processing the at least second received signal out of the received spread-spectrum signal.

DETAILED DESCRIPTION

Figure 1:
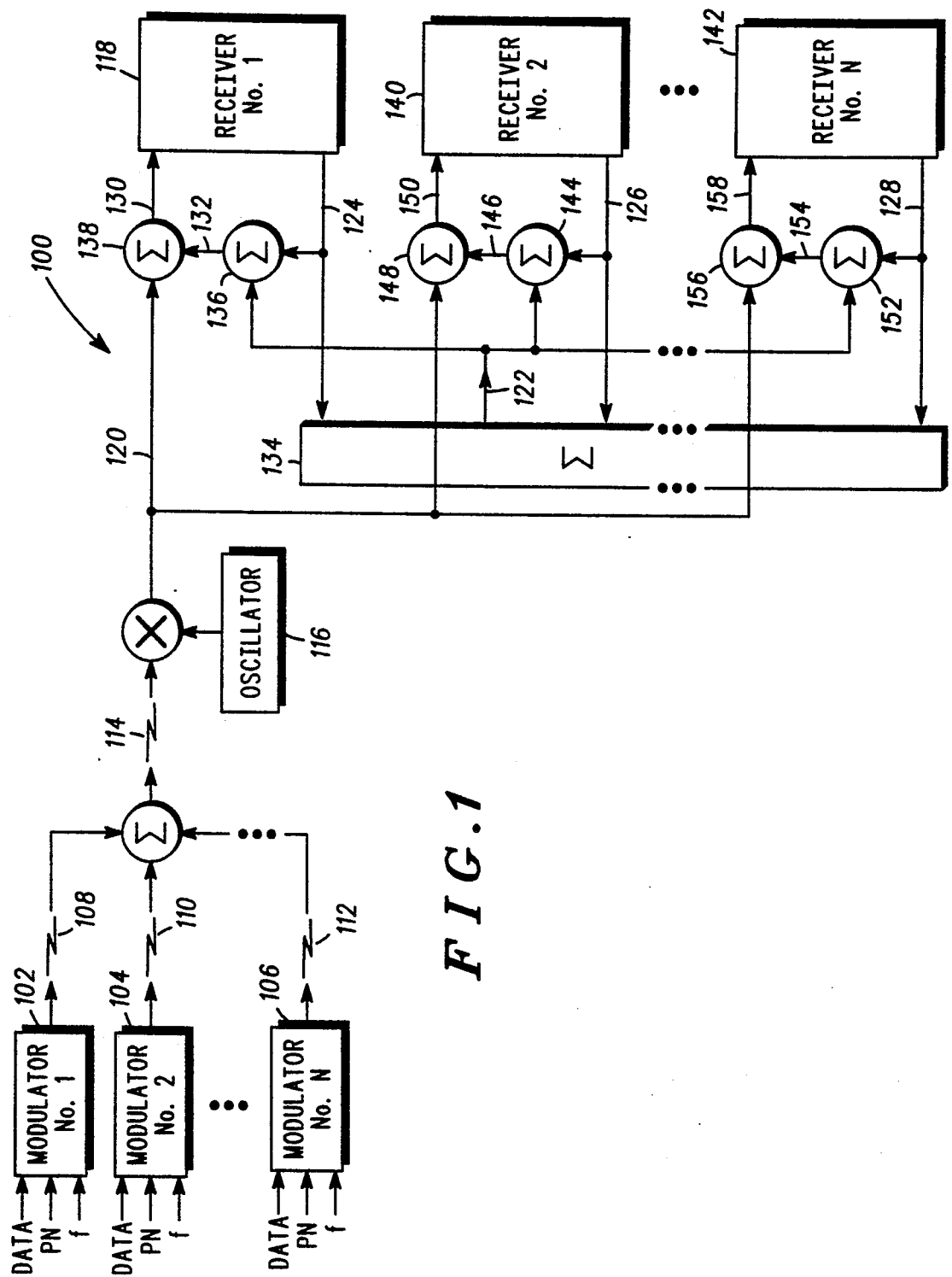
FIG. 1 is a diagram showing a preferred embodiment user-to-base communication network link with a spread spectrum noise canceller.

Referring now to FIG. 1, a diagram is shown of a preferred embodiment user-to-base communication network link with a spread spectrum noise canceller. The noise canceller utilizes the base communication network or user's knowledge of the received signals. By knowing the data, spreading code, and carrier phase of each received signal, the interference caused by undesired signals can be cancelled, thereby leaving only additive noise in a particular desired received signal. When this is implemented in a base communication network unit (e.g., base station), several advantageous results can be realized by the communication network. These advantages include: removing or reducing spreading code interference from the received signal, increasing the number of users on a particular CDMA communication channel due to increased capability of the base station to handle in the communication channel, and enabling the use of smaller handheld user radio communication units because less transmitter power is required when the interfering CDMA code noise is cancelled for adequate signal reception at the base station.

In the one preferred embodiment, as shown in FIG. 1, the base station 100 demodulates strong spread spectrum signals from the communication channel in a particular cell site. The base station 100 determines or knows from previously-stored information in the base station 100 the carrier phase, PN spreading code, and data for each user. This means that total knowledge is available at the base station 100 about each of the received signals and thus cancellation of each of the received signals from a particular received signal can be achieved. Even though base station 100 demodulates strong spread spectrum signals from the CDMA communication channel, a certain amount of weak spread spectrum signals from adjacent cells will exist in the communication channel. These weak spread spectrum signals will add to the total noise in the communication channel of the particular cell site being demodulated by the base station 100.

It will be appreciated by those skilled in the art that spreading codes other than PN spreading codes can be used to separate data signals from one another in a CDMA communication system. For instance, Walsh codes can be used to separate a plurality of data signals. A particular data signal can be separate from the other data signals by using a particular Walsh code to spread the particular data signal. For example, in a 64 channel CDMA spread spectrum system, a particular Walsh code can be selected from a set of 64 Walsh codes within a 64 by 64 Hadamard matrix. A Walsh code corresponds to a single row or column of the Hadamard matrix.

In the preferred embodiment, the modulation scheme of the signals is assumed to be quadrature phase shift keying (QPSK). However, it will be appreciated by those skilled in the art that other modulation techniques can be used without departing from the teachings of the present invention. The modulators 102, 104 and 106 represent N number of modulators of N users of a communication link from the modulators 102, 104 and 106 to base station 100. The modulators 102, 104 and 106 generate spread spectrum signals 108, 110 and 112 which, when added together, form a significant portion of the spread spectrum signal found in the communication channel 114. The composite of spread spectrum signals in the communication channel 114 are received by the base station 100. In the preferred embodiment, the communication channel 114 for cellular communication system is in the 900 MHz region of the electromagnetic spectrum. However, other regions of the electromagnetic spectrum may be used without departing from the teachings of the present invention. In order to simplify hardware of the receivers in the base station 100, the composite received signal is converted to a signal 120 at a frequency of about 10 MHz by an oscillator 116. This conversion of the received composite spread spectrum signal 114 enables the remaining receiver components to be implemented in a digital form. It will be appreciated by those skilled in the art that the following techniques could also be adapted for use on analog signals.

Referring more particularly to a first receiver 118, first receiver 118 generates an estimated signal 124 of the spread spectrum signal 108 transmitted by the first modulator 102. This first estimated signal 124 preferably is derived from a composite estimated signal 122 of N estimated signals, the digitally-compatible signal 120 form of received composite spread spectrum signal 114, and the first estimated signal 124 itself. Composite estimated signal 122 is formed by summing with an arithmetic unit 134 the estimated signals 124, 126 and 128 generated by first receiver 118, second receiver 140 and N receiver 142, respectively. Composite estimated signal 122 is similar to the digital received composite signal 120 except for the additive noise and weak signals from adjacent cells in the communication system. More specifically, the difference between the composite estimated signal 122 and the digital received composite signal 120 is that the digital received composite signal 120 includes non-deterministic noise consisting of two components. The two components to the non-deterministic noise are:

All of the CDMA spread spectrum signals which are not being demodulated by the base station 100. These consist of a large number of low-level interfering users using the same communication channel as the base station 100 which are in nearby cells.

Receiver front end noise. By design, additive noise preferably is below the composite spread spectrum signal 114 when the communication channel is operating at full capacity.

First estimated signal 124 is subtracted with an arithmetic unit 136 from the composite estimated signal 122 to form a first estimated interference signal 132. This first estimated interference signal 132 is subtracted with an arithmetic unit 138 from the digital received composite signal 120 to form a first approximate signal 130. The first approximate signal 130 is provided to receiver 118 so that the first estimated signal 124 can be generated.

Similarly, a second receiver 140 generates an estimated signal 126 of the spread spectrum signal 110 transmitted by the second modulator 104. This second estimated signal 126 preferably is derived from the composite estimated signal 122 of N estimated signals, the digital received composite signal 120, and the second estimated signal 126 itself. Second estimated signal 126 is subtracted with an arithmetic unit 144 from the composite estimated signal 122 to form a second estimated interference signal 146. This second estimated interference signal 146 is subtracted with an arithmetic unit 148 from the digital received composite signal 120 to form a second approximate signal 150. The second approximate signal 150 is provided to receiver 140 so that the second estimated signal 126 can be generated.

Similarly, an Nth receiver 142 generates an estimated signal 128 of the spread spectrum signal 112 transmitted by the Nth modulator 106. This Nth estimated signal 128 preferably is derived from the composite estimated signal 122 of N estimated signals, the digital received composite signal 120, and the Nth estimated signal 128 itself. Nth estimated signal 128 is subtracted with an arithmetic unit 152 from the composite estimated signal 122 to form an Nth estimated interference signal 154. This Nth estimated interference signal 154 is subtracted with an arithmetic unit 156 from the digital received composite signal 120 to form an Nth approximate signal 158. The Nth approximate signal 158 is provided to receiver 142 so that the Nth estimated signal 128 can be generated.

Figure 2:
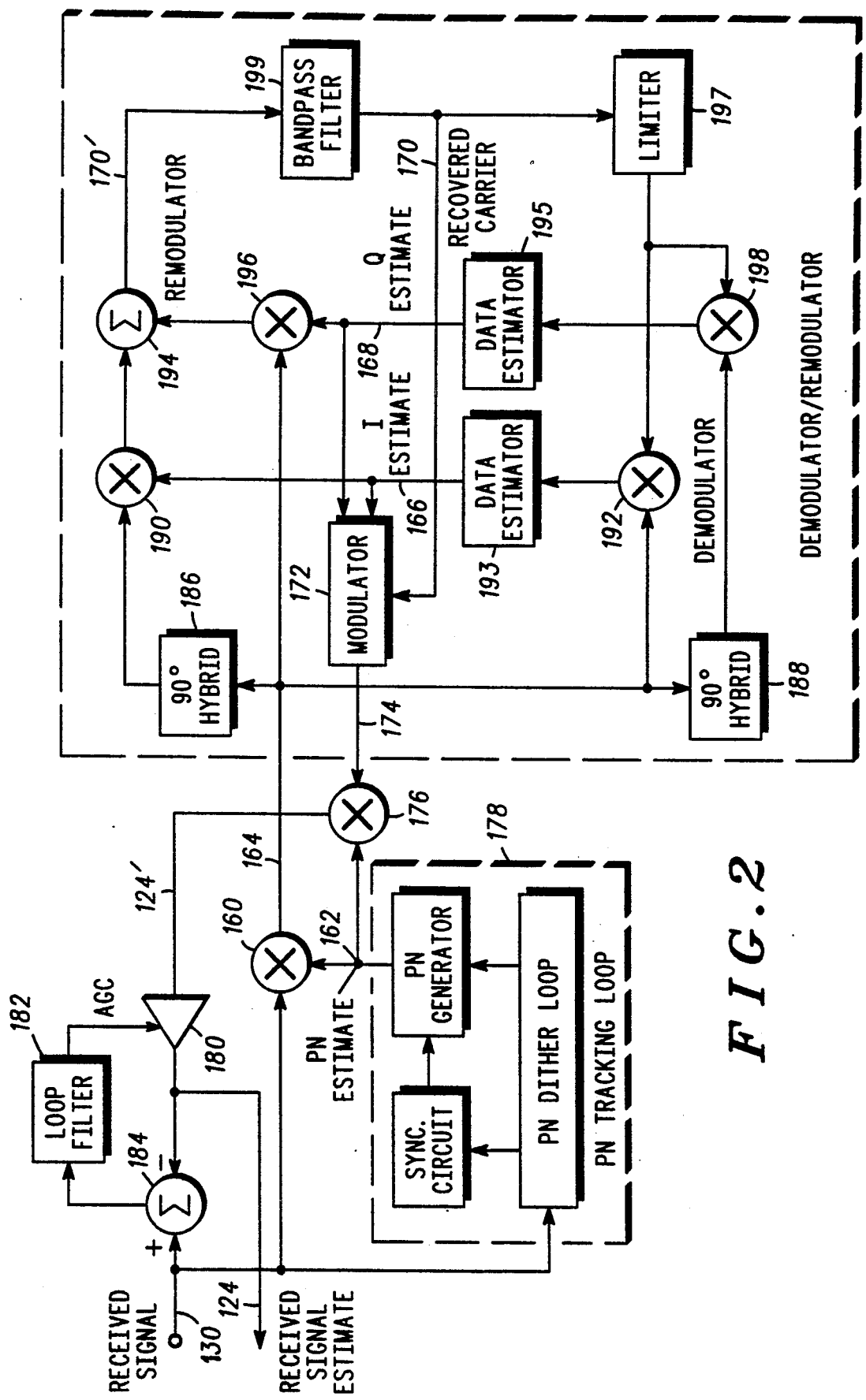
FIG. 2 is a diagram showing a preferred embodiment internal structure of a receiver for use in the user-to-base communication network link spread spectrum noise canceller.

FIG. 2 shows a diagram of a preferred embodiment internal structure of the first receiver 118 for use in the user-to-base-station communication network link spread spectrum noise canceller. It will be appreciated by those skilled in the art that other techniques of receiving a signal and generating an estimate signal may be used. The following description provides details of one techniques which may be used to accomplish the generation of an estimated signal in a receiver. Each of the N receivers preferably is configured to operate in a similar manner.

The first approximate signal 130 is mixed by a mixer 160 with the "PN estimate" 162 of the first modulator 102 PN spreading code which strips off the spreading code to form a QPSK signal 164. The despread signal 164 is a QPSK modulated signal. The QPSK signal 164 is demodulated with a demodulate/remodulate loop which generates data estimations of I signal 166 and Q signal 168 components of the QPSK signal 164 as well as a recovered carrier 170.

A QPSK remodulator is formed from 90 degree hybrid 186, mixers 190 and 196 and arithmetic unit 194. Signal 164 is operated on by 90 degree hybrid 186 to form a modified signal 164 which is provided to mixer 190. An unmodified signal 164 is provided to mixer 196. The in phase (I) and quadrature (Q) data is removed from the signals 164 provided to mixers 190 and 196, respectively. The output signals of mixers 190 and 196 are summed together by arithmetic unit 194 to produce a recovered carrier 170' which is free of data. This recovered carrier 170' is bandpass filtered by filter 199 to reduce the noise on the recovered carrier 170' to form recovered carrier 170.

A QPSK demodulator is formed from 90 degree hybrid 188, mixers 192 and 198, limiter 197 and data estimators 193 and 195. Limiter 197 hard limits recovered carrier 170. Signal 164 is mixed with hard limited carrier 170 by mixer 192. The output signal of mixer 192 is a noisy replica of the I data and is passed through a data estimator 193 to generate a data signal 166 estimation of I. Signal 164 is operated on by 90 degree hybrid 188 to form a modified signal 164 which is provided to mixer 198. The modified signal 164 is mixed with hard limited carrier 170 by mixer 198. The output signal of mixer 198 is a noisy replica of the Q data and is passed through a data estimator 195 to generate a data signal 168 estimation of Q.

The data estimations of I signal 166 and Q signal 168 modulate recovered carrier 170 with a modulator 172 to form a modulated QPSK signal 174. Modulated QPSK signal 174 is mixed by a mixer 176 with the PN spreading code estimate 162 generated by PN tracking loop 178 to form the first estimate signal 124'. The first estimate signal 124' is amplified by an amplifier 180 and subtracted from the first approximate signal 130 by an arithmetic unit 184 to generate an error signal for feedback to a feedback network with a filter 182. The filtered error signal is provided to amplifier 180 as a gain control signal. Amplifier 180, arithmetic unit 184 and filter 182 form an automatic gain control loop. The signal output by the amplifier 180 is the first estimate signal 124.

Although the discussion of FIGS. 1 and 2 relates to the communication link from modulators of user units to base stations, the user units can similarly use the above-discussed techniques to cancel the strong pilot signals from the base station from the weak user signal in the base-station-to-user unit communication link.

Figure 3:
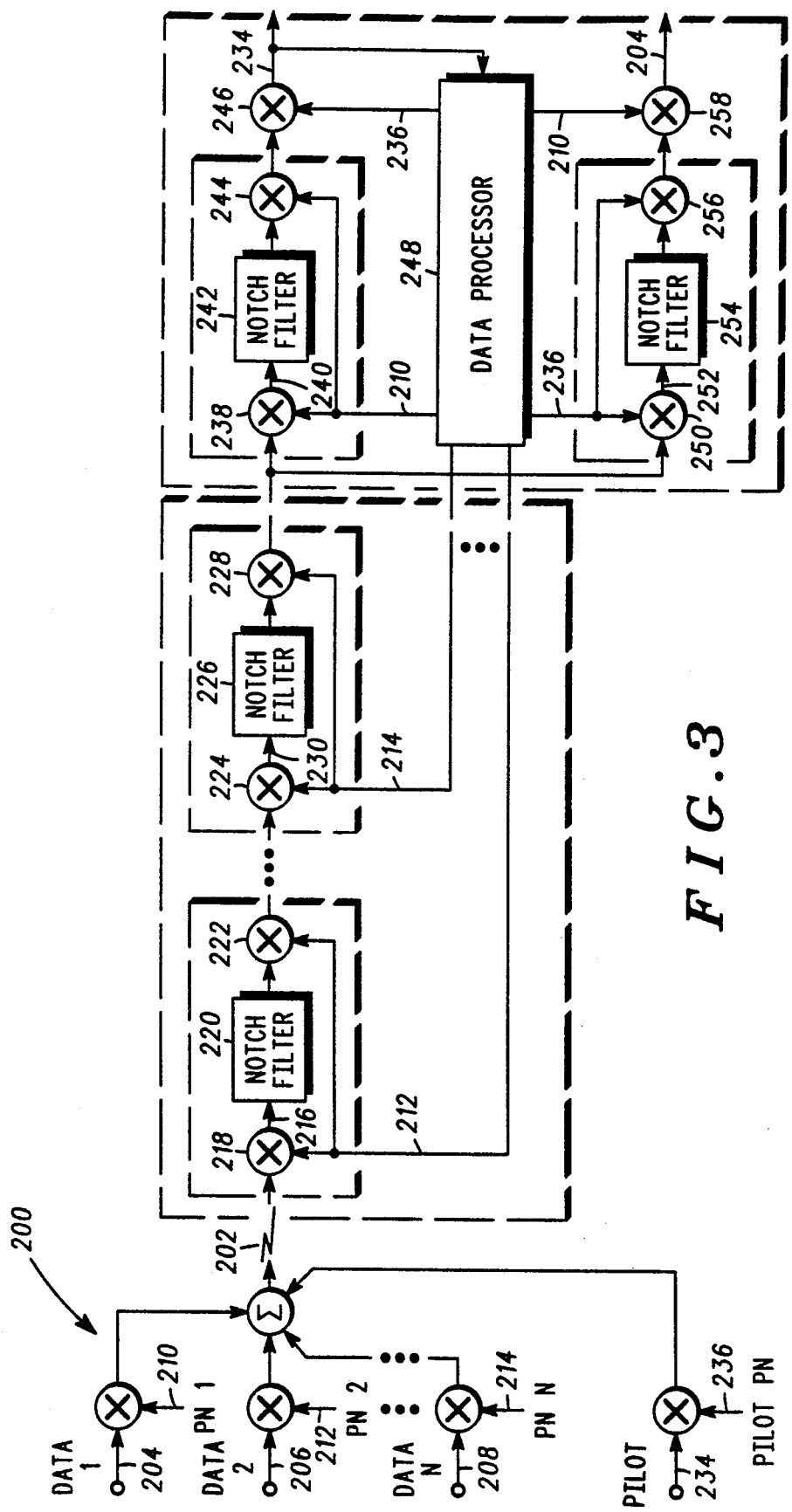
FIG. 3 is a diagram showing a preferred embodiment base-to-user communication network link with a spread spectrum noise canceller.

An alternative embodiment of the present invention is shown in FIG. 3. FIG. 3 shows a diagram of a preferred embodiment base-station-to-user communication network link with a spread spectrum noise canceller. The noise canceller utilizes the two constants in CDMA spread spectrum communication systems. These two constants are:

Each user unit is locked to a pilot signal or multiple pilot signals.

Each interfering user unit and pilot PN spreading code is known and has a fixed timing relation which is established at a base station and is defined on the pilot channel carrying the pilot signals.

By knowing these two constants, the interference caused by undesired signals in the base-station-to-user-unit communication link can be cancelled in a particular desired received signal. When this is implemented in user units, several advantageous results can be realized by the communication network. These advantages include: removing or reducing undesired and pilot spreading code interference from the received signal and increasing the number of users on a particular CDMA communication channel due to the increased capability of the user units to handle interference in the communication channel.

Composite spread spectrum signal 202 preferably consists of the sum of user data 204, 206 and 208 from first, second through Nth users which is spread by PN codes 210, 212 and 214, respectively, associated with each user and a pilot signal derived from pilot data 234 spread by pilot PN code 236. It will be appreciated by those skilled in the art that these PN code channels, depicted as being transmitted from one communication unit 200 in FIG. 3, may be distributed among several communication units at a plurality of signal transmission sites. In other words, the composite signal 202 comprises the sum of all of the spread spectrum signals within a particular frequency band from the various transmission sites. The undesired interfering signals are removed from the desired user signal by removing them one at a time. For example, in the case of the desired signal being a first spread spectrum signal derived from user data 204 from a first user, the second interferer (i.e. the second spread spectrum signal derived from user data 206 from a second user) is removed from the composite spread spectrum signal 202 by spreading, through the use of a mixer 218, the composite signal 202 with the spreading code 212 associated with the second user to form a second despread signal 216. The second despread signal 216 has several components, including user data 206 which is despread because of the spreading operation of mixer 218. A narrow band filter 220 preferably is used to notch user data 206 out of the second despread signal 216, thereby leaving the other spread spectrum user signals in the second despread signal minus that portion notched out by the filter 220. By spreading, through the user of a mixer 222, the remaining despread signal 216 with the spreading code 212, the composite signal is restored without the second user data 206 and the slight loss of other signals notched out by filter 220.

This removal operation is repeated for each of the remaining N known interferers until the only signals remaining in the composite signal 202 are the desired first spread spectrum signal and the pilot signal. In removing the Nth spread spectrum signal derived from user data 208 from an Nth user, the Nth signal is removed from the composite spread spectrum signal 202 by spreading, through the use of a mixer 224, the remaining composite signal 202 with the spreading code 214 associated with the Nth user to form an Nth despread signal 230. The Nth despread signal 230 has several components including user data 208 which is despread because of the spreading operation of mixer 224. A narrow band filter 226 preferably is used to notch user data 208 out of the Nth despread signal 230, thereby leaving the other spread spectrum user signals in the Nth despread signal minus that portion notched out by the filter 226. By spreading, through the use of a mixer 228, the remaining despread signal 230 with the spreading code 214, the composite signal is restored without the Nth user data 208 and the slight loss of other signals notched out by filter 226.

The above removal operations are enabled by first locking the pilot signal, thereby allowing the processing of the pilot signal to recover information about all of the user codes. Such information can be used to cancel the corresponding interferers. The cancelling operation in the alternative embodiment of the present invention can be performed in the IF or baseband frequencies.

After serially removing the undesired user spread spectrum signal, the composite signal 202 consists predominantly of the desired first user spread spectrum signal and the pilot signal. The pilot data 234 can be derived from the remaining composite signal 202 by removing the desired first user spread spectrum signal from the remaining spread spectrum 202 and spreading the subsequently remaining signal with the pilot PN spreading code 236. In removing the first user spread spectrum signal derived from user data 204 from a first user, the first signal is removed from the remaining composite spread spectrum signal 202 by spreading, through the use of a mixer 234, the remaining composite signal 202 with the spreading code 210 associated with the first user to form a first despread signal 240. The first despread signal 240 has several components including user data 204 which is despread because of the spreading operation of mixer 238. A narrow band filter 242 preferably is used to notch user data 204 out of the first despread signal 240, thereby leaving the other spread spectrum user signals in the first despread signal minus that portion notched by the filter 242. By spreading, through the use of a mixer 244, the remaining despread signal 240 with the spreading code 210, the composite signal is restored without the first user data 204 and the slight loss of other signals notched out by filter 242. Subsequently, the pilot data 234 can be derived from the remaining composite signal 202 by spreading, through the use of a mixer 246, the remaining composite signal 202 with the pilot spreading code 236. The pilot data is provided to a data processor 248 so that the user PN spreading codes can be provided to each stage of the noise canceller as needed.

Similarly, the first user data 204 can be derived from the remaining composite signal 202 by removing the pilot spread spectrum signal from the remaining spread spectrum 202 and spreading the subsequently remaining signal with the first user PN spreading code 210. In removing the pilot spread spectrum signal derived from pilot data 234, the pilot signal is removed from the remaining composite spread spectrum signal 202 by spreading, through the use of a mixer 250, the remaining composite signal 202 with the spreading code 236 associated with the pilot signal to form an pilot despread signal 252. The pilot despread signal 252 has several components including pilot data 234 which is despread because of the spreading operation of mixer 250. A narrow band filter 254 preferably is used to notch pilot data 234 out of the pilot despread signal 252, thereby leaving the first user spread spectrum signal in the pilot despread signal minus that portion notched out by the filter 254. By spreading, through the use of a mixer 256, the remaining despread signal 252 with the spreading code 236, the composite signal is restored without the pilot user data 234 and the slight loss of other signals notched out by filter 254. Subsequently, the first user data 204 can be derived from the remaining composite signal 202 by spreading, through the use of a mixer 258, the remaining composite signal 202 with the first user spreading code 210.

Figure 4:
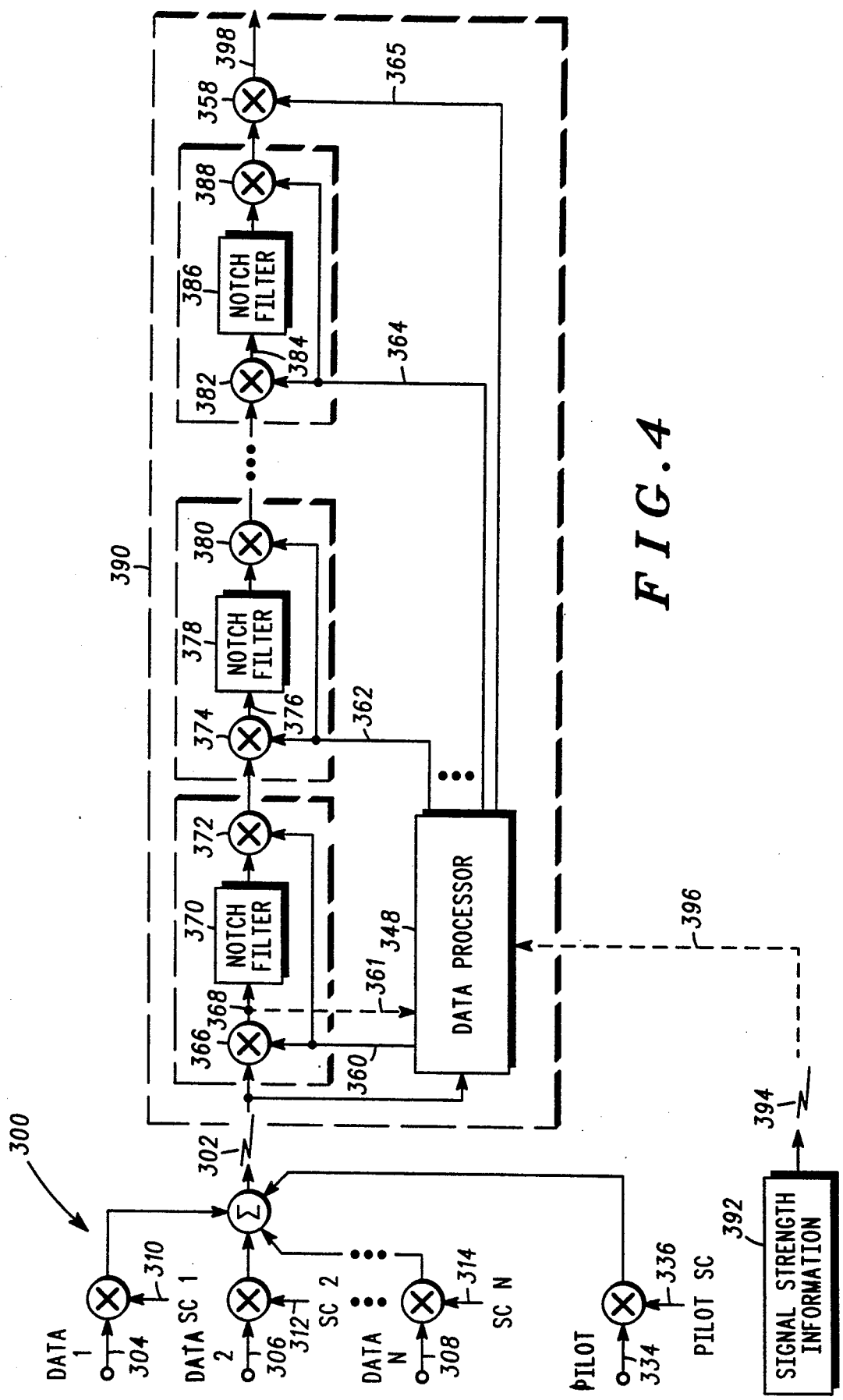
FIGS. 4-6 are diagrams showing alternative preferred embodiment communication network links with spread spectrum noise cancellers.

An alternative embodiment of the present invention is shown in FIG. 4. FIG. 4 shows a diagram of a preferred embodiment communication network link with a spread spectrum noise canceller. In this alternative embodiment, in order to remove an interfering signal, the noise canceller removes a portion of the composite spread-spectrum channel spectrum from the channel. The communication network link can be a base-station-to-user or a user-to-base-station link. The noise canceller 390 preferably is provided with particular operating environment data concerning the preferred embodiment CDMA spread spectrum communication system. This operating environment data is:

the spreading code associated with the desired and interfering spread spectrum signals that the noise canceller 390 will be cancelling;

the timing relationship for the desired spread spectrum signal with respect to its associated spreading code as well as the interfering signals with respect to their associated spreading codes; and the signal strengths of each of these interfering signals. In the preferred embodiment shown in FIG. 4, the noise canceller 390 is provided with this operating environment data by having the noise canceller 390 include a data processor 348 which has previously stored in memory the spreading codes of the received desired and interfering signals. In addition, the data processor 348 determines the timing relationship for the desired spread spectrum signal with respect to its associated spreading code as well as the interfering signals with respect to their associated spreading codes. Further, data processor 348 measures the relative received signal strength of the desired signal with respect to the received signal strength of each of the interfering signals.

By knowing this operating environment data, the interference caused by undesired signals in the base-station-to-user or user-to-base-station communication link can be cancelled in a particular desired received signal. When this noise canceller is implemented in communication units, several advantageous results can be realized by the communication network. These advantages include: removing or reducing undesired spreading code interference from the received signal and thereby increasing the capacity for users on a particular CDMA communication channel.

It will be appreciated by those skilled in the art that other techniques of acquiring the operating environment data for this preferred embodiment noise cancellation technique may be used without departing from the scope of the present invention.

For example, the composite signal 302 received by the noise canceller 390 may include a pilot signal having pilot data 334 spread by pilot spreading code 336. The pilot data 334 preferably includes the spreading codes associated with the other received desired and interfering signals within the composite signal 302. In this alternative technique for acquiring the operating environment data, the data processor 348 only needs to have previously stored in memory the pilot spreading code. The data processor 348 provides this pilot spreading code through coupler 360 to mixer 366 which spreads the received composite signal 302 such that the pilot data 334 is despread. The despread pilot data 334 is then provided to data processor 348 by coupler 361. The data processor 348 subsequently derives the spreading codes associated with the other received desired and interfering signals from the pilot data 334. Subsequently, the data processor 348 provides the appropriate spreading code to each stage of the noise canceller as needed.

In addition, the pilot data 334 may also include the timing relationship for the desired spread spectrum signal with respect to its associated spreading code as well as the interfering signals, except for the pilot signal, with respect to their associated spreading codes. As a result, the data processor 348 only needs to determine the timing relationship between the pilot signal with respect to its associated spreading code. The other timing relationships will be derived from the pilot data 334.

In addition, the pilot data 334 may also include the relative received signal strength measurement of the desired signal with respect to the received signal strength of each of the interfering signals. As a result, the data processor 348 explicitly knows these signal strength measurements and therefore does not need to measure the relative signal strengths of the desired and interfering signals.

In another example, data processor 348 may not measure the relative received signal strength of the desired signal with respect to the received signal strength of each of the interfering signals. Rather, the data processor 348 may receive the signal strength measurements from an external device through coupler 396. The signal strength measurement device 392 may be substantially proximate the noise canceller 390. Alternatively, the signal strength measurement device 392 may be substantially remote from the noise canceller 390. When the measurement device 392 is not proximate the noise canceller 390, the signal strength measurements could be transmitted to the noise canceller 390 on an auxiliary channel 394 or be included in the pilot data 334 within the composite signal 302. The advantage of using an external signal strength measurement device 392 is that the measurement device could be shared with other noise cancellers within the communication system.

In yet another example, the noise canceller 390 may be able to derive estimated signal strengths of the desired and interfering signals from their timing relationships. Alternatively, the noise canceller may implicitly know from the preferred embodiment communication system parameters that a pilot signal is always relatively stronger than any other signal within the composite signal 302.

Turning now to a more detailed discussion of the preferred embodiment noise canceller 390 shown operating in a communication network link in FIG. 4, a communication unit 300 transmits a composite signal 302 to a noise canceller 390. The composite spread spectrum signal 302 preferably consists of the sum of data signals within first, second through Nth code channels, respectively. The data signals preferably being derived from data 304, 306 through 308 which are each spread respectively by spreading codes 310, 312 and 314. In an alternative embodiment, the composite signal 302 also includes a pilot signal derived from pilot data 334 spread by pilot spreading code 336 such that the pilot signal is in a pilot code channel. It will be appreciated by those skilled in the art that these code channels, depicted as being transmitted from one communication unit 300 in FIG. 4, may be distributed among several communication units at a plurality of signal transmission sites. In other words, the composite signal 302 comprises the sum of all of the spread spectrum signals within a particular frequency band from the various transmission sites which are received by the noise canceller 390.

The signal strengths of the interfering signals are compared to the desired signal and all of the undesired interfering signals having a signal strength greater than the desired signal are removed from the composite signal one at a time in a serial manner. Since this preferred embodiment interfering signal cancellation is a linear operation, it is not necessary for the interfering signal to be removed from the composite signal 302 in a strongest to weakest order. However, removing interfering signals having a signal strength less than the desired signal may degrade the composite signal 302 beyond a point that the desired signal can be detected and retrieved from the composite signal. In addition, it will be appreciated by those skilled in the art that a spread spectrum signal (e.g., the desired signal) typically can be detected and retrieved from a composite signal when it's signal strength is greater than the signal strengths of interfering signals. Thus, the removal of interfering signals from composite signal 302 which have a signal strength less than the desired signal is unnecessary and may unduly increase the detection and retrieval time of the desired signal.

For example, in the case of the desired signal being a first spread spectrum signal derived from data 304, an interferer is removed from the composite spread spectrum signal 302 by spreading, through the use of a mixer 366, the composite signal 302 with the spreading code of the interfering signal provided through coupler 360 to form a despread signal output on coupler 368. The despread signal has several components, including the interfering despread data which is despread because of the spreading operation of mixer 366. A notch filter 370 preferably is used to notch the interfering despread data out of the despread signal input to the filter 370 by coupler 368, thereby leaving the other spread spectrum signals in the despread signal minus that portion notched out by the filter 370. By spreading, through the use of a mixer 372, the remaining despread signal with the spreading code of the interfering signal provided through coupler 360, the composite signal is restored without the interfering data and the slight loss of other signals notched out by filter 370.

This removal operation is repeated for each of the remaining N known interferers having a stronger signal strength than the desired signal until the only signals remaining in the composite signal 302 are the desired first signal and the interfering signals having a signal strength less than the desired signal.

For instance, one of the interfering signals which has a stronger signal strength than the second spread spectrum signal derived from data 306. The second signal is removed from the composite spread spectrum signal 302 by spreading, through the use of a mixer 374, the composite signal 302 with the spreading code 312 provided through coupler 362 associated with the second data 306 to form a second data despread signal output on coupler 376. The second despread signal has several components, including data 306 which is despread because of the spreading operation of mixer 374. A notch filter 378 preferably is used to notch data 306 out of the second data despread signal input to the filter 378 by coupler 376, thereby leaving the other spread spectrum signals in the second despread signal minus that portion notched out by the filter 378. By spreading, through the use of a mixer 380, the remaining despread signal with the spreading code provided though coupler 362, the composite signal 302 is restored without the second data 306 and the slight loss of other signals notched out by filter 378.

The last spread spectrum signal having a signal strength greater than the desired signal is removed from the composite spread spectrum signal 302 by spreading, through the use of a mixer 382, the remaining composite signal 302 with the spreading code of the last interfering signal provided though the coupler 364 to form a last strong interferer despread signal output on coupler 384. The last strong despread signal has several components including last strong interfering data which is despread because of the spreading operation of mixer 382. A notch filter 386 preferably is used to notch the last strong interfering data out of the last strong despread signal, thereby leaving the other spread spectrum signals in the last strong despread signal minus that portion notched out by the filter 386. By spreading, through the use of a mixer 388, the remaining despread signal with the spreading code provided through coupler 364, the composite signal is restored without the last strong interferer data and the slight loss of other signals notched out by filter 386.

After serially removing the undesired interfering spread spectrum signals, the composite signal 302 consists predominantly of the desired first data 304 and the interfering signals having a signal strength less than the desired signal. The first data 304 can be derived from the remaining composite signal 302 by spreading, through the use of a mixer 358, the remaining signal with the first spreading code 310 provided through coupler 365. Subsequently, the desired first data 304 can be output from noise canceller 390 by coupler 398.

Figure 5:
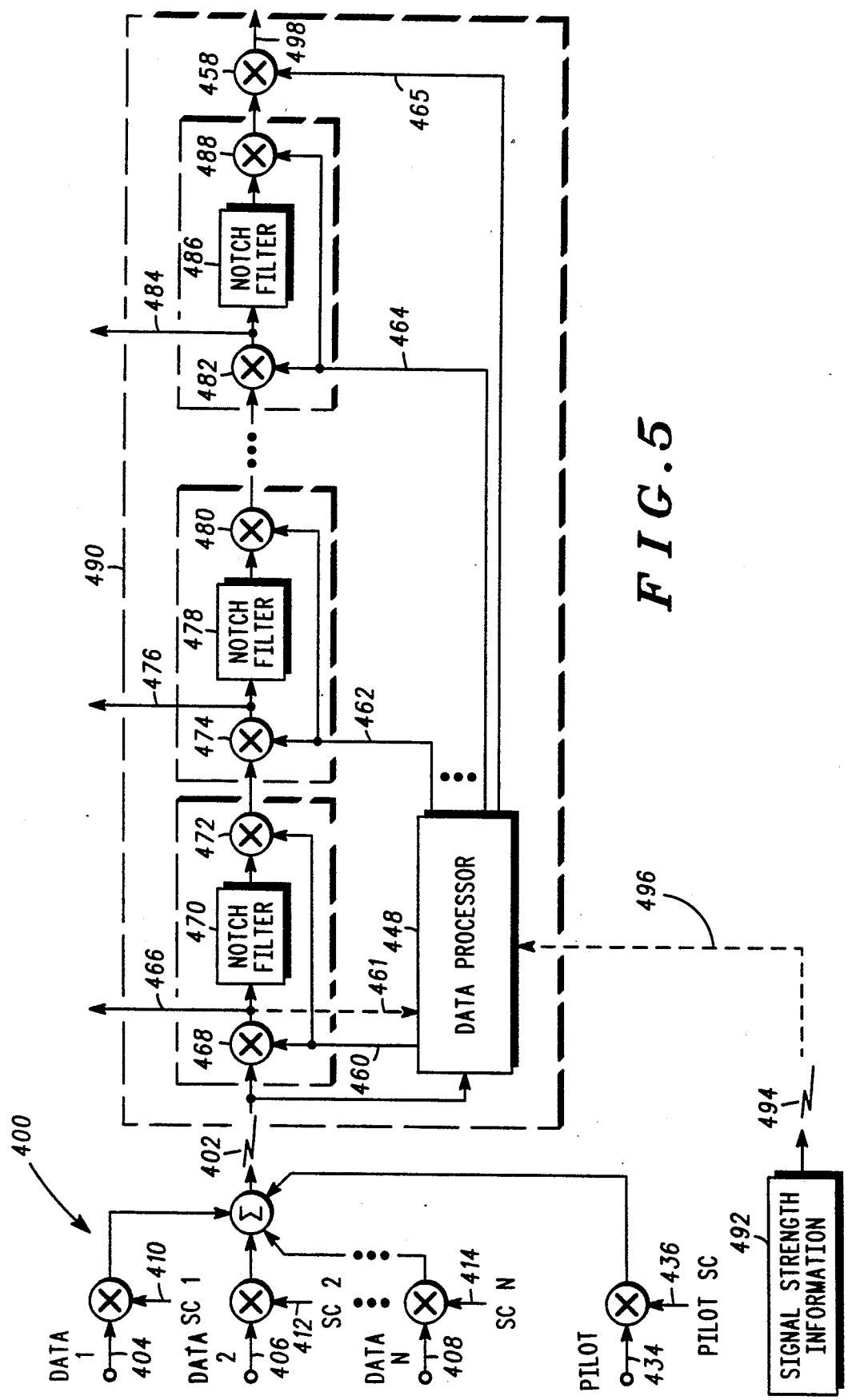

An alternative embodiment of the present invention is shown in FIG. 5. FIG. 5 shows a diagram of a preferred embodiment communication network link with a spread spectrum noise canceller similar to the alternative preferred embodiment shown in FIG. 4. However, the alternative preferred embodiment shown in FIG. 5 has been optimized to selectively cancel noise when detecting and retrieving more than one data signal from the composite spread spectrum signal 402. The communication network link can be a base-station-to-user or a user-to-base-station link. The noise canceller 490 preferably is provided with particular operating environment data concerning the preferred embodiment CDMA spread spectrum communication system. This operating environment data is:

the spreading code associated with the desired and interfering spread spectrum signals that the noise canceller 490 will be cancelling;

the timing relationship for the desired spread spectrum signal with respect to its associated spreading code as well as the interfering signals with respect to their associated spreading codes; and the signal strengths of each of these interfering signals. In the preferred embodiment shown in FIG. 5, the noise canceller 490 is provided with this operating environment data by having the noise canceller 490 include a data processor 448 which has previously stored in memory the spreading codes of the received desired and interfering signals. In addition, the data processor 448 determines the timing relationship for the desired spread spectrum signal with respect to its associated spreading code as well as the interfering signals with respect to their associated spreading codes. Further, data processor 448 measures the relative received signal strength of the desired signal with respect to the received signal strength of each of the interfering signals.

By knowing this operating environment data, the interference caused by undesired signals in the base-station-to-user or user-to-base-station communication link can be cancelled in a particular desired received signal. When this noise canceller is implemented in communication units, several advantageous results can be realized by the communication network. These advantages include: removing or reducing undesired spreading code interference from the received signal and thereby increasing the capacity for users on a particular CDMA communication channel.

It will be appreciated by those skilled in the art that other techniques of acquiring the operating environment data for this preferred embodiment noise cancellation technique may be used without departing from the scope of the present invention.

For example, like in the preferred embodiment shown in FIG. 4, the composite signal 402 received by the noise canceller 490, shown in FIG. 5, may include a pilot signal having pilot data 434 spread by pilot spreading code 436. The pilot data 434 preferably includes the spreading codes associated with the other received desired and interfering signals within the composite signal 402. Thus, the data processor 448 only needs to have previously stored in memory the pilot spreading code. The data processor 448 uses this pilot spreading code, coupler 460, mixer 466 and coupler 461 to derive the spreading codes associated with the other received desired and interfering signals from the pilot data 434. Subsequently, the data processor 448 provides the appropriate spreading code to each stage of the noise canceller as needed.

In addition, the pilot data 434 may also include the timing relationship for the desired spread spectrum signal with respect to its associated spreading code as well as the interfering signals, except for the pilot signal, with respect to their associated spreading codes. As a result, the data processor 448 only needs to determine the timing relationship between the pilot signal with respect to its associated spreading code. The other timing relationships will be derived from the pilot data 434.

In addition, the pilot data 434 may also include the relative received signal strength measurement of the desired signal with respect to the received signal strength of each of the interfering signals. As a result, the data processor 348 explicitly knows these signal strength measurements and therefore does not need to measure the relative signal strengths of the desired and interfering signals.

In another example, like in the preferred embodiment shown in FIG. 4, data processor 448, shown in FIG. 5, may not include a mechanism for measuring the relative received signal strength of the desired signal with respect to the received signal strength of each of the interfering signals. Rather, the data processor 448 may receive the signal strength measurements from an external device through coupler 496. The signal strength measurement device 492 may be substantially proximate the noise canceller 490. Alternatively, the signal strength measurement device 492 may be substantially remote from the noise canceller 490. Further, the signal strength measurements could be transmitted to the noise canceller 490 on an auxiliary channel 494 or be included in the pilot data 434 within the composite signal 402. The advantage of using an external signal strength measurement device 492 is that the measurement device could be shared with other noise cancellers within the communication system.

In yet another example, like in the preferred embodiment shown in FIG. 4, the noise canceller 490, shown in FIG. 5, may be able to derive estimated signal strengths of the desired and interfering signals from their timing relationships. Alternatively, the noise canceller may implicitly know from the preferred embodiment communication system parameters that a pilot signal is always relatively stronger than any other signal within the composite signal 402.

Turning now to a more detailed discussion of the preferred embodiment noise canceller 490 operating in a communication network link shown in FIG. 5 which is similar to the alternative preferred embodiment shown in FIG. 4, a communication unit 400 transmits a composite signal 402 to noise canceller 490. The composite spread spectrum signal 402 preferably consists of the sum of data signal within first, second through Nth code channels, respectively. The data signals preferably being derived from data 404, 406, through 408 which are each spread respectively by spreading codes 410, 412 and 414. In an alternative embodiment, the composite signal 402 also includes a pilot signal derived from pilot data 434 spread by pilot spreading code 436 such that the pilot signal is in a pilot code channel. It will be appreciated by those skilled in the art that these code channels, depicted as being transmitted from one communication unit 400 in FIG. 5, may be distributed among several communication units at a plurality of signal transmission sites. In other words, the composite signal 402 comprises the sum of all of the spread spectrum signals within a particular frequency band from the various transmission sites which are received by the noise canceller 490.

The signal strengths of the interfering signals are compared to the desired signal and all of the undesired interfering signals having a signal strength greater than the desired signal are removed from the composite signal. The interfering signals are serially removed beginning with the interfering signal with the greatest signal strength and continuing in order of decreasing signal strength. The order of removing interfering signals is significant because in this preferred embodiment more than one data signal may be detected and retrieved from the composite signal 402 with the same noise canceller 490. Therefore, in order to only remove interfering signals which have a greater signal strength than that of the data signal to be detected and retrieved, it is necessary for the interfering signal to be removed from the composite signal 402 in a strongest to weakest order.

For example, the composite spread spectrum signal 402 may include a first desired spread spectrum signal derived from data 404 and second desired spread spectrum signal derived from data 406 as well as at least one interfering signal related to at least one interfering spreading code. In this example, the interfering signal has a signal strength which is stronger than the desired first and second signals and the desired second signal is stronger than the desired first signal. Thus, since the interfering signal has a signal strength greater than either of the desired signals, it should be removed from the composite spread spectrum signal 402 before the desired first and second signals. It will be appreciated by those skilled in the art that the relative signal strengths have been arbitrarily assigned to facilitate this particular example. Further, that the preferred embodiment of present invention shown in FIG. 5 is not limited in the scope of it's use to situations having desired and interfering signals with the particular relative signal strengths described in this example.

The interfering signal is removed by spreading, through the use of a mixer 466, the composite signal 402 with the spreading code of the interfering signal provided through coupler 460 to form a despread signal output on coupler 468. The despread signal has several components, including the interfering despread data which is despread because of the spreading operation of mixer 466. This despread interfering data may be output from the noise canceller 490 on coupler 468. A notch filter 470 preferably is used to notch the interfering despread data out of the despread signal input to the filter 470 by coupler 468, thereby leaving the other spread spectrum signals in the despread signal minus that portion notched out by the filter 470. By spreading, through the use of a mixer 472, the remaining despread signal with the spreading code of the interfering signal provided through coupler 460, the composite signal is restored without the interfering data and the slight loss of other signals notched out by filter 470.

Since the desired second signal, in this example, has a signal strength greater than the first desired signal, it should be removed from the remaining composite spread spectrum signal 402 output from mixer 472 before the desired first signal. The desired second spread spectrum signal derived from data 406 can be retrieved from the remaining composite signal 402 during the process of removing it from the composite signal 402. The desired second signal is removed by spreading, through the use of a mixer 474, the composite signal 402 with the spreading code 412 associated with the desired second data 406 provided though coupler 462 to form a second data despread signal output on coupler 476. The despread signal has several components, including second data 406 which is despread because of the spreading operation of mixer 474. This despread second data 406 may be recovered from the composite signal 402 by outputting the second data 406 from the noise canceller 490 on coupler 476. A notch filter 478 preferably is used to notch second data 406 out of the second data despread signal input to the filter 478 by coupler 476, thereby leaving the other spread spectrum signals in the second despread signal minus that portion notched out by the filter 478. By spreading, through the use of a mixer 480, the remaining despread signal with the spreading code 412 provided though coupler 462, the composite signal 402 is restored without the second data 406 and the slight loss of other signals notched out by filter 478.

This removal operation may be repeated for each of the remaining N known interferers having a stronger signal strength than the desired first signal until the only known signals remaining in the composite signal 402 is the desired first signal and the interfering signals having a signal strength less than the desired signal.

The last spread spectrum signal having a signal strength greater than the desired first signal is removed by spreading, through the use of a mixer 482, the remaining composite signal 402 with the spreading code of the last interfering signal provided through coupler 464 to form a last strong despread signal output on coupler 484. The last strong despread signal has several components including last strong data which is despread because of the spreading operation of mixer 482. This despread last strong data may be output from the noise canceller 490 on coupler 468. A notch filter 486 preferably is used to notch the last strong data out of the last strong despread signal provided through coupler 484, thereby leaving the other spread spectrum signals in the last strong despread signal minus that portion notched out by the filter 486. By spreading, through the use of a mixer 488, the remaining despread signal 484 with the spreading code provided through coupler 464, the composite signal is restored without the last strong data and the slight loss of other signals notched out by filter 486.

After serially removing the other stronger signal strength desired and interfering spread spectrum signals, the composite signal 402 consists predominantly of the desired first data 404 and the interfering signals having a signal strength less than the desired signal. The first data 404 can be derived from the remaining composite signal 402 by spreading, through the use of a mixer 458, the remaining composite signal 402 with the first spreading code 410 provided through coupler 465. Subsequently, the desired first data 404 can be output from noise canceller 490 by coupler 498.

Figure 6:
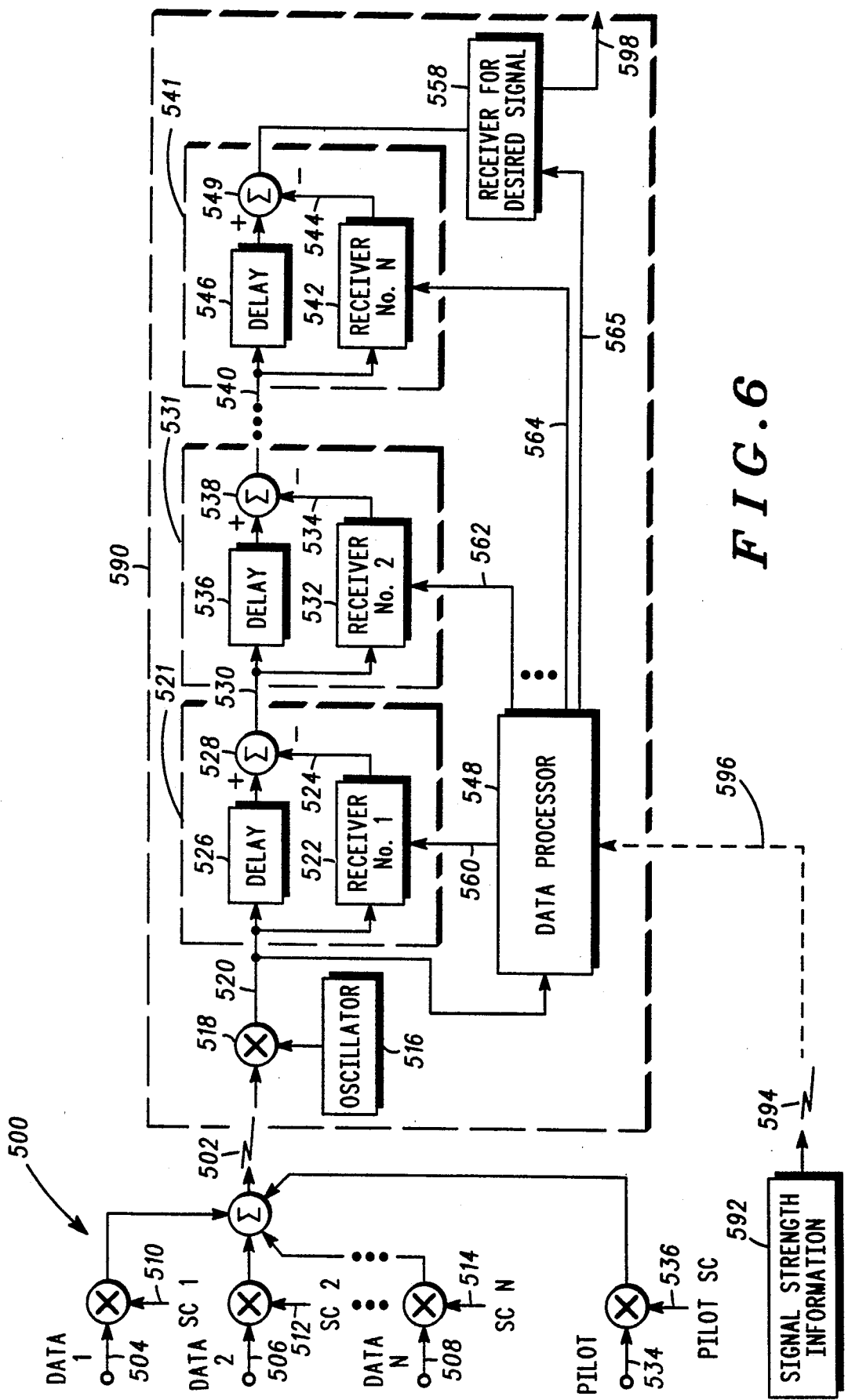

An alternative embodiment of the present invention is shown in FIG. 6. This alternative embodiment differs from the noise canceller embodiments shown in FIGS. 4 and 5 which remove a portion of the composite spread-spectrum channel spectrum from the channel. In this alternative embodiment, the interfering signal is detected, reconstructed and subsequently subtracted from the composite spread-spectrum signal. The communication network link can be a base-station-to-user or a user-to-base-station link. The noise canceller 590 preferably is provided with particular operating environment data concerning the preferred embodiment CDMA spread spectrum communication system. This operating environment data is:

the spreading code associated with the desired and interfering spread spectrum signals that the noise canceller 590 will be cancelling;

the timing relationship for the desired spread spectrum signal with respect to its associated spreading code as well as the interfering signals with respect to their associated spreading codes; and the signal strengths of each of these interfering signals.

In the preferred embodiment shown in FIG. 6, the noise canceller 590 is provided with this operating environment data by having the noise canceller 590 include a data processor 548 which has previously stored in memory the spreading codes of the received desired and interfering signals. In addition, the data processor 548 determines the timing relationship for the desired spread spectrum signal with respect to its associated spreading code as well as the interfering signals with respect to their associated spreading codes. Further, data processor 548 measures the relative received signal strength of the desired signal with respect to the received signal strength of each of the interfering signals.

By knowing this operating environment data, the interference caused by undesired signals in the base-station-to-user or user-to-base-station communication link can be cancelled in a particular desired received signal. When this noise canceller is implemented in communication units, several advantageous results can be realized by the communication network. These advantages include: removing or reducing undesired spreading code interference from the received signal and thereby increasing the capacity for users on a particular CDMA communication channel.

It will be appreciated by those skilled in the art that other techniques of acquiring the operating environment data for this preferred embodiment noise cancellation technique may be used without departing from the scope of the present invention.

For example, data processor 548 may not include a mechanism for measuring the relative received signal strength of the desired signal with respect to the received signal strength of each of the interfering signals. Rather, the data processor 548 may receive the signal strength measurements from an external device through coupler 596. The signal strength measurement device 592 may be substantially proximate to the noise canceller 590. Alternatively, the signal strength measurement device 592 may be substantially remote from the noise canceller 590. Further, the signal strength measurements could be transmitted to the noise canceller 590 on an auxiliary channel 594. The advantage of using an external signal strength measurement device 592 is that the measurement device could be shared with other noise cancellers within the communication system.

In yet another example, the noise canceller 590 may be able to derive estimated signal strengths of the desired and interfering signals from their timing relationships. Alternatively, the noise canceller may implicitly know from the preferred embodiment communication system parameters that a pilot signal is always relatively stronger than any other signal within the composite signal 502.

Turning now to a more detailed discussion of the preferred embodiment noise canceller 590 operating in a communication network link shown in FIG. 6, a communication unit 500 transmits a composite signal 502 to noise canceller 590. The composite spread spectrum signal 502 preferably consists of the sum of data signals within first, second through Nth code channels, respectively. The data signals preferably being derived from data 504, 506, through 508 which are each spread respectively by spreading codes 510, 512 and 514. In an alternative embodiment, the composite signal 502 also includes a pilot signal derived from pilot data 534 spread by pilot spreading code 536 such that the pilot signal is in a pilot code channel. It will be appreciated by those skilled in the art that these code channels, depicted as being transmitted from one communication unit 500 in FIG. 6, may be distributed among several communication units at a plurality of signal transmission sites. In other words, the composite signal 502 comprises the sum of all of the spread spectrum signals within a particular frequency band from the various transmission sites which are received by the noise canceller 590.

In the preferred embodiment, the communication channel for cellular communication system is in the 900 MHz region of the electromagnetic spectrum. However, other regions of the electromagnetic spectrum may be used without departing from the teachings of the present invention. In order to simplify hardware of the receivers in the noise canceller 590, the composite received signal 502 is converted to a signal at a frequency of about 10 MHz by an oscillator 516 and provided to a coupler 520. This conversion of the received composite spread spectrum signal 502 enables the remaining receiver components to be implemented in a digital form. It will be appreciated by those skilled in the art that the following techniques could also be adapted for use on analog signals.

The signal strengths of the interfering signals are compared to the desired signal and all of the undesired interfering signals having a signal strength greater than a particular predetermined threshold value are removed from the digital composite signal. The predetermined threshold value may be the signal strength of the desired signal. However, in this preferred embodiment noise cancelling technique improvement in the ability to recover the desired signal may occur even when interfering signals having less signal strength than the desired signal are cancelled. The particular threshold level is dependant not only on the signal strength of the desired signal, but also on other communication system parameters. Therefore, the predetermined threshold may be set lower than the desired signal's signal strength.

The interfering signals are serially subtracted from the composite digital signal beginning with the interfering signal with the greatest signal strength and continuing in order of decreasing signal strength. The order of subtracting interfering signals is significant because in this preferred embodiment more than one data signal may be detected and retrieved from the digital composite signal with the same noise canceller 590. Therefore, in order to only subtract interfering signals which have a greater signal strength than that of the predetermined threshold for the particular data signal to be detected and retrieved, it is necessary for the interfering signal to be subtracted from the digital composite signal in a strongest to weakest order. Also, this preferred embodiment noise cancellation technique includes a non-linear decision process and as such the best decisions are made for the stronger interfering signals.

Referring now more particularly to an example of operation of the noise canceller 590, the digital composite spread spectrum signal provided on coupler 520 may include a first desired spread spectrum signal derived from data 504 as well as at least one interfering signal related to at least one interfering spreading code. In this example, the interfering signal has a signal strength which is stronger than the desired first signal. Thus, since the interfering signal has a signal strength greater than either of the desired signals, it should be subtracted from the digital composite spread spectrum signal provided on coupler 520 before the desired first signal. It will be appreciated by those skilled in the art that the relative signal strengths have been arbitrarily assigned to facilitate this particular example. Further, that the preferred embodiment of present invention shown in FIG. 6 is not limited in the scope of it's use to situations having desired and interfering signals with the particular relative signal strengths described in this example.

The strongest interfering signal is subtracted from the digital composite signal provided on coupler 520 by a subtraction mechanism 521. The digital composite signal provided on coupler 520 preferably is input to a first receiver 522. First receiver 522 also receives a spreading code of the strongest interfering signal from data processor 548 through coupler 560. The first receiver 522 generates a first receiver estimated signal (i.e., an estimate of this strongest interfering signal) and outputs it on coupler 524. This first estimated signal is derived from the digital composite signal 520 through the use of the interfering signal's spreading code. The digital composite signal provided on coupler 520 is also input to a delay mechanism 526 which delays the passage of the composite signal to an input of arithmetic unit 528 by a predetermined amount of time. The predetermined amount of time equals the time delay between inputting a spread spectrum signal into the first receiver 522 and the first receiver 522 outputting a first estimated signal on coupler 524. The arithmetic unit 528 subtracts the first estimated signal provided on coupler 524 from the delayed digital composite signal and outputs the remaining digital composite signal on coupler 530. In an alternative preferred embodiment, the first estimated signal can also be output from the noise canceller 590 on coupler 524.

A preferred embodiment receiver is shown in FIG. 2 and discussed above. The first receiver 522, second receiver 532 and Nth receiver 542 as well as the receiver for the desired signal 558 can all be configured similar to the receiver shown in FIG. 2. The receiver inputs a spread spectrum signal on coupler 130 and outputs an estimated signal for a particular estimated signal on coupler 124 (which in FIG. 6 for example with respect to the first receiver 522 corresponds to coupler 524). The particular spread spectrum signal to be estimated is determined by the spreading code tracking loop 178. As shown in FIG. 2, the spreading code is generated within the spreading code tracking loop 178. However, in the preferred embodiment shown in FIG. 6 the noise canceller 590 has been optimized to have data processor 548 provides the functions of the spreading code tracking loop 178 thereby eliminating the need for the spreading code tracking loop 178. Thus, for example, the first receiver 522 is similar to the receiver depicted in FIG. 2, but with the spreading code tracking loop 178 replaced by coupler 560 which is connected to the receiver at the point labelled 162 in FIG. 2. Similarly, couplers 562, 564 and 565 replace the spreading code tracking loops in their respective receivers 532, 542 and 558. In an alternative embodiment of the present invention, the actual estimated data for the particular estimated signal may be output from the noise canceller 590 by couplers attached to the I data estimate coupler 166 and Q data estimate 168 coupler.

Within the above described example operation of the noise canceller 590, the digital composite spread spectrum signal provided on coupler 530 may also include a interfering second signal. Further, that the interfering second signal is derived from the second spreading code 512 and the second data 506. In this example, the interfering second signal has a signal strength which is stronger than the desired first signal and weaker than the interfering signal subtracted from the digital composite signal 520 by the subtraction mechanism 521. Thus, since the stronger interfering signal has already been subtracted from the digital composite signal on coupler 530, the next signal to be subtracted from the digital composite signal should be the interfering second signal. More precisely, the stronger interfering second signal should be subtracted from the digital composite signal before the weaker desired first signal.

The interfering second signal is subtracted from the digital composite signal provided on coupler 530 by a subtraction mechanism 531. The digital composite signal provided on coupler 530 preferably is input to a second receiver 532. Second receiver 532 also receives a spreading code 512 of the interfering second signal from data processor 548 through coupler 562. The second receiver 532 generates a second receiver estimated signal (i.e., an estimate of this interfering second signal) and outputs it on coupler 534. This second estimated signal is derived from the digital composite signal 530 through the use of the interfering second signal's spreading code 512. The digital composite signal provided on coupler 530 is also input to a delay mechanism 536 which delays the passage of the composite signal to an input of arithmetic unit 538 by a predetermined amount of time. The predetermined amount of time equals the time delay between inputting a spread spectrum signal into the second receiver 532 and the second receiver 532 outputting a second estimated signal on coupler 534. The arithmetic unit 538 subtracts the second estimated signal provided on coupler 534 from the delayed digital composite signal and outputs the remaining digital composite signal on coupler 540. In an alternative preferred embodiment, the second estimated signal can also be output from the noise canceller 590 on coupler 534.

This interfering signal subtraction operation may be repeated for each of the remaining N known interferers having a stronger signal strength than the predetermined threshold related to desired first signal. Within the above described example operation of the noise canceller 590, the digital composite spread spectrum signal provided on coupler 540 may also include an interfering Nth signal. In this example, the interfering Nth signal has a signal strength which is stronger than the desired first signal and weaker than the interfering signals subtracted from the digital composite signal 530 by the subtraction mechanism 531. Thus, since the stronger interfering signals have already been subtracted from the digital composite signal on coupler 540, the next signal to be subtracted from the digital composite signal should be the interfering Nth signal. More precisely, the stronger interfering Nth signal should be subtracted from the digital composite signal before the weaker desired first signal.

The interfering Nth signal is subtracted from the digital composite signal provided on coupler 540 by a subtraction mechanism 541. The digital composite signal provided on coupler 540 preferably is input to a Nth receiver 542. Nth receiver 542 also receives a spreading code of the interfering second signal from data processor 548 through coupler 564. The Nth receiver 542 generates a Nth receiver estimated signal (i.e., an estimate of this interfering Nth signal) and outputs it on coupler 544. This Nth estimated signal is derived from the digital composite signal 540 through the use of the interfering Nth signal's spreading code. The digital composite signal provided on coupler 540 is also input to a delay mechanism 546 which delays the passage of the composite signal to an input of arithmetic unit 549 by a predetermined amount of time. The predetermined amount of time equals the time delay between inputting a spread spectrum signal into the Nth receiver 542 and the Nth receiver 542 outputting an Nth estimated signal on coupler 544. The arithmetic unit 549 subtracts the Nth estimated signal provided on coupler 544 from the delayed digital composite signal and outputs the remaining digital composite signal to a desired receiver 558. In an alternative preferred embodiment, the Nth estimated signal can also be output from the noise canceller 590 on coupler 544.

After serially subtracting the other desired and interfering spread spectrum signals, the digital composite signal consists predominantly of the desired first signal derived from first data 504 and first spreading code 510 and the interfering signals having a signal strength less than the predetermined threshold. The digital composite signal is input to a desired signal receiver 558. Desired signal receiver 558 also receives a spreading code of the desired first signal from data processor 548 through coupler 565. The desired signal receiver 558 generates an estimate of the desired first signal and outputs it on coupler 598. This estimate of the desired first signal is derived from the input digital composite signal through the use of the desired first signal's spreading code 510.

It will be appreciated by those skilled in the art that the above discussion concerning relative signal strengths has not addressed the situation in which all of the received signals do not have the same bit or chip rates. For example, a pilot signal may have a smaller information bandwidth than the other data signals and therefore the signal strength measurements should be determined with respect to energy per bit rather than the power per bit.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, it will be appreciated by those skilled in the art that the above described noise cancellation techniques can be performed in the IF or baseband

What is claimed is:

1. A spread-spectrum noise canceller, comprising:
    (a) receiving means for receiving a spread-spectrum signal including a first signal and at least one second signal;
    (b) processing means operatively coupled to the receiving means for reducing spread-spectrum noise in the received spread-spectrum signal by:
        (i) determining a received signal strength for each particular at least one second signal; and (ii) removing serially each particular at least one second signal which has a received signal strength greater than a predetermined threshold from the received spread-spectrum signal through the use of a spreading code associated with that particular at least one second signal to produce a processed spread-spectrum signal; and (c) retrieving means operatively coupled to the processing means for retrieving the first signal from the processed spread-spectrum signal through the use of a spreading code associated with the first signal.

2. The spread-spectrum noise canceller of claim 1 wherein:

(a) the processing means comprises means for storing the spreading codes associated with the first signal and the at least one second signal; and (b) the associated spreading codes are stored in the means for storing prior to the receiving means receiving the spread-spectrum signal including the first signal and the at least one second signal.

3. The spread-spectrum noise canceller of claim 1 wherein:

(a) the processing means comprises means for storing the spreading codes associated with the first signal and the at least one second signal;

(b) the spreading code associated with the at least second signal is stored in the means for storing prior to the receiving means receiving the spread-spectrum signal including the first signal and the at least one second signal; and (c) the processing means further comprises means for retrieving the spreading code associated with the first signal from the received spread-spectrum signal through the use of the stored spreading code associated with the at least one second signal and storing the retrieved spreading code in the means for storing prior to the retrieving means retrieving the first signal from the processed spread-spectrum signal.

4. The spread-spectrum noise canceller of claim 1 wherein the processing means determines the received signal strength of the at least one second signal by measuring a signal strength of the at least one second signal within the received spread-spectrum signal.

5. The spread-spectrum noise canceller of claim 1 wherein the processing means determines the received signal strength of the at least one second signal by receiving a measurement of a signal strength of the at least one second signal within the received spread-spectrum signal from a device external to the spread-spectrum noise canceller.

6. The spread-spectrum noise canceller of claim 1 wherein the predetermined threshold comprises a received signal strength of the first signal.

7. The spread-spectrum noise canceller of claim 1 wherein the predetermined threshold is derived from a received signal strength of the first signal and at least one other operating environment parameter of the noise canceller.

8. The spread-spectrum noise canceller of claim 1 wherein:

(a) the at least one second signal received by the receiving means comprises a second and a third signal;

(b) the processing means determines a received signal strength for the second and the third signal;

(c) each received signal strength of the second and the third signals, respectively, is greater than the predetermined threshold; and (d) the processing means serially removes the second and the third signal from the received spread-spectrum signal, respectively, through the use of a spreading code associated with the second signal and through the use of the spreading code associated with the third signal.

9. The spread-spectrum noise canceller of claim 8 wherein:

(a) the processing means determines that the received signal strength of the second signal is greater than the received signal strength of the third signal; and (b) the processing means serially removes the second and the third signal from the received spread-spectrum signal in order of decreasing signal strengths such that the second signal is removed from the received spread-spectrum signal prior to the third signal being removed from the received spread-spectrum signal.

10. The spread-spectrum noise canceller of claim 1 wherein the processing means removes each particular at least one second signal by despreading the received spread-spectrum signal with the spreading code associated with the at least one second signal, processing the at least second signal out of the received spread-spectrum signal, and spreading the remaining spread-spectrum signal with the spreading code associated with the at least one second signal.

11. The spread-spectrum noise canceller of claim 1 wherein the processing means removes each particular at least one second signal by generating an estimate of the particular at least one second signal through the use of the spreading code associated with the particular at least one second signal and subtracting the particular estimated at least one second signal from the spread-spectrum signal.

12. The spread-spectrum noise canceller of claim 1 wherein the processing means comprises retrieving means for retrieving the particular at least one second signal from the received spread-spectrum signal through the use of the spreading code associated with that particular at least one second signal prior to removing that particular at least one second signal from the received spread-spectrum signal.

13. The spread-spectrum noise canceller of claim 1 wherein the receiving means comprises conversion means for converting the spread-spectrum signal from a first frequency range to a second frequency range, the second frequency range being such that the received spread-spectrum signal can be digitally manipulated.

14. A method of canceling spread-spectrum noise, comprising:

(a) receiving a spread-spectrums signal including a first signal and at least one second signal;

(b) determining a received signal strength for each particular at least one second signal;

(c) removing serially each particular at least one second signal which has a received signal strength greater than a predetermined threshold from the received spread-spectrum signal through the use of a spreading code associated with that particular at least one second signal to produce a processed spread-spectrum signal; and (d) retrieving the first signal from the processed spread-spectrum signal through the use of a spreading code associated with the first signal.

15. The method of claim 14 further comprising the step of storing, prior to the step of receiving the spread-spectrum signal, the spreading codes associated with the first signal and the at least one second signal.

16. The method of claim 14 further comprising the steps of:
(a) storing, prior to the step of receiving the spread-spectrum signal, the spreading code associated with the at least one second signal; and
(b) retrieving, after the step of receiving the spread-spectrum signal, the spreading code associated with the first signal from the received spread-spectrum signal through the use of the stored spreading code associated with the at least one second signal
(c) storing, prior to the step of retrieving the first signal, the retrieved spreading code.

17. The method of claim 14 wherein the step of determining the received signal strength of the at least one second signal comprises measuring a signal strength of the at least one second signal within the received spread-spectrum signal.

18. The method of claim 14 wherein the step of determining the received signal strength of the at least one second signal comprises receiving a measurement of the signal strength of the at least one second signal within the received spread-spectrum signal from a device external to the device which removes serially each particular at least one second signal from the received spread-spectrum signal.

19. The method of claim 14 wherein the predetermined threshold comprises a received signal strength of the first signal.

20. The method of claim 14 wherein the predetermined threshold is derived from a received signal strength of the first signal and at least one other noise canceling operating environment parameter.

21. The method of claim 14 wherein:
(a) the step of receiving at least one second signal comprises receiving a second and a third signal;
(b) the step of determining the received signal strength for each particular at least one second signal comprises determining a received signal strength for the second and the third signal;
(c) each received signal strength of the second and the third signal, respectively, is greater than the predetermined threshold; and
(d) the step of removing comprises serially removing the second and the third signal from the received spread-spectrum signal, respectively, through the use of a spreading code associated with the second signal and through the use of the spreading code associated with the third signal.

22. The method of claim 21 wherein:
(a) the received signal strength of the second signal is greater than the received signal strength of the third signal; and
(b) the step of removing comprises serially removing the second signal and the third signal from the received spread-spectrum signal in order of decreasing signal strengths such that the second signal is removed from the received spread-spectrum signal prior to the third signal being removed from the received spread-spectrum signal.

23. The method of claim 14 wherein the step of removing comprises removing each particular at least one second signal by despreading the received spread-spectrum signal with the spreading code associated with the at least one second signal, processing the at least one second signal out of the received spread-spectrum signal, and spreading the remaining spread-spectrum signal with the spreading code associated with the at least one second signal.

24. The method of claim 14 wherein the step of removing comprises removing each particular at least one second signal by generating an estimate of the particular at least one second signal through the use of the spreading code associated with the particular at least one second signal and subtracting the particular estimated at least one second signal from the spread-spectrum signal.

25. The method of claim 14 further comprising the step of retrieving, prior to the step of removing, the particular at least one second signal from the received spread-spectrum signal through the use of the spreading code associated with that particular at least one second signal.

26. The method claim 14 further comprising the step of converting, after the step of receiving the spread-spectrum signal, the spread-spectrum signal from a first frequency range to a second frequency range such that the received spread-spectrum signal can be manipulated digitally in the second frequency range.

* * * * *